(12) United States Patent
Sawaki

(10) Patent No.: US 6,583,894 B1
(45) Date of Patent: Jun. 24, 2003

(54) POWER SUPPLY DEVICE AND METHOD UTILIZABLE IN ELECTRONIC APPARATUS

(75) Inventor: Yukichi Sawaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/391,494

(22) Filed: Sep. 8, 1999

(30) Foreign Application Priority Data

Sep. 9, 1998 (JP) .......................................... 10-255136

(51) Int. Cl.⁷ .......................... H04N 1/40; H04N 1/36; G05F 3/00
(52) U.S. Cl. ........................ 358/446; 358/421; 323/304
(58) Field of Search ............................... 358/400, 468, 358/446, 420, 422, 423, 426.09, 426.11, 434, 421; 379/100.01; 307/66, 64, 65, 69, 43, 26; 323/205, 234, 275, 304

(56) References Cited

U.S. PATENT DOCUMENTS

| | | | | |
|---|---|---|---|---|
| 4,837,813 A | * | 6/1989 | Terajima | 379/113 |
| 5,255,312 A | * | 10/1993 | Koshiishi | 379/100 |
| 5,410,419 A | * | 4/1995 | Muramatsu et al. | 358/468 |
| 5,737,706 A | * | 4/1998 | Seazholtz et al. | 455/466 |
| 5,834,857 A | * | 11/1998 | Abe et al. | 307/66 |
| 5,854,885 A | * | 12/1998 | Abe | 395/113 |

FOREIGN PATENT DOCUMENTS

| | | |
|---|---|---|
| JP | U-3-1684 | 1/1991 |
| JP | A-8-181801 | 7/1996 |

* cited by examiner

*Primary Examiner*—Madeleine Nguyen
(74) *Attorney, Agent, or Firm*—Oliff & Berridge, PLC

(57) ABSTRACT

A power supply device and power supply method that may be used with an electronic apparatus, such as a facsimile machine. In the device and method, a communication device is placed in a sleep mode while a copy process is conducted. During the sleep mode, power is not supplied to the circuits of the communication device that are necessary for transmission with an external transmission line. Thus, a load current loaded to a DC voltage of +5V can be efficiently reduced. As a result, the energy quantity consumed in a regulator of the power supply device may be reduced. Accordingly, heating of the regulator can be restrained and useless energy consumption may be prevented.

32 Claims, 3 Drawing Sheets

POWER SUPPLY DEVICE AND METHOD UTILIZABLE IN ELECTRONIC APPARATUS

BACKGROUND OF THE INVENTION

1. Field of Invention

The present invention relates to a power supply device useable in an electronic apparatus, such as a facsimile apparatus, for example. In particular, the invention relates to a power supply device by which heat produced from a regulator producing a stable DC voltage can be efficiently restrained.

2. Description of Related Art

Conventionally, in various electronic apparatuses, a power supply device is provided in which a primary side of a transformer is connected to a AC power source and a desirable DC voltage is produced at a secondary side of the transformer. With such a conventional power supply device, a preferable DC voltage is obtained by converting power into heat. Therefore, the problem arises that the power supply device heats up and energy consumption becomes large. Thus, the conventional power supply device is not preferable from an energy conservation point of view.

SUMMARY OF THE INVENTION

The present invention provides a power supply device and method useable, for example, in a facsimile apparatus or other electronic apparatus. The power supply device according to one embodiment of the invention includes a transformer with a primary side connected to an AC power source and a secondary side which produces a DC voltage. The power supply device further includes a first DC voltage producing part which produces a stable first DC voltage based on a winding ratio between a primary coil at the primary side and a secondary coil at the secondary side.

A second DC voltage producing part is provided which includes a regulator that produces a stable second DC voltage from a non-stable DC voltage changing according to a load current loaded to the first DC voltage producing part. The power supply device further includes a reducing means for reducing a load current loaded to the second DC voltage producing part when the non-stable DC voltage increase.

According to the above power supply device, when the non-stable DC voltage increases the reducing means reduces the load current loaded to the second DC voltage producing part. Thereby, even if the non-stable DC voltage increases corresponding to an increase of the load current loaded to the first DC voltage producing part, the load current loaded to the second DC voltage producing part can be reduced by the reducing means. Thus, the DC current value loaded to the regulator is reduced, as a result, energy quantity emitted from the regulator can be reduced. Further, heating of the regulator can be efficiently restrained and energy saving can be realized by reducing useless energy consumption.

When the power supply device is used in a facsimile apparatus, the facsimile apparatus having a copy function which makes use of the first DC voltage produced in the first DC voltage producing part, the reducing means may reduce the load current loaded to the second DC voltage producing part when the copy function is conducted. Further, if the above power supply device is used with a multi-function facsimile apparatus having a facsimile function, a scanner function, a printer function, a copy function, and the like, even if the load current loaded to the first DC voltage producing part increases when, for example, the copy function, in which both the scanner function and the printer function are executed at the same time, is conducted, the load current loaded to the first DC voltage producing part can be reduced by the reducing means. Thereby, the DC current value loaded to the regulator is reduced and the amount of energy emitted from the regulator can be reduced. Additionally, heating of the regulator can be efficiently restrained and energy savings can be realized by reducing useless energy consumption.

In another embodiment of the above power supply device, the power supply device is used with a facsimile apparatus having a modem operated by the second DC voltage produced in the second DC voltage producing part, the modem conducting transmission with an external transmission line. In this embodiment of the power supply device, the reducing means reduces a load current necessary for the modem to operate when a copy function is conducted. Thereby, even if the load current loaded to the first DC voltage producing part increases due to execution of the copy function, the load current necessary for the modem to operate can be reduced by the reducing means.

Accordingly, the load current loaded to the second DC voltage producing part can be reduced and the DC voltage value loaded to the regulator can be reduced. As a result, the amount of energy emitted from the regulator can be certainly reduced.

In a further embodiment of the power supply device, the power supply device is applied to a facsimile apparatus that has a setting part for setting an operating condition of the reducing means. In this embodiment of the power supply device, the reducing operation of the reducing means is selectively conducted based on the operating condition set by the setting part when a call signal from the external transmission line is detected while the copy function is conducted.

In the above application of the power supply device, the reducing operation of the load current for modem operation by the reducing means can be selectively conducted based on the operating condition set by the setting part when the call signal from the external transmission line is detected while the copy function is conducted. Thereby, even if the transmission with the external transmission line becomes impossible due to the copy function and the load current for modem operation being reduced by the reducing means, the second DC voltage can be supplied to the modem based on the operating condition set by the setting part. Therefore, transmission with the external transmission line can be performed while the copy function is conducted.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Figure 1:
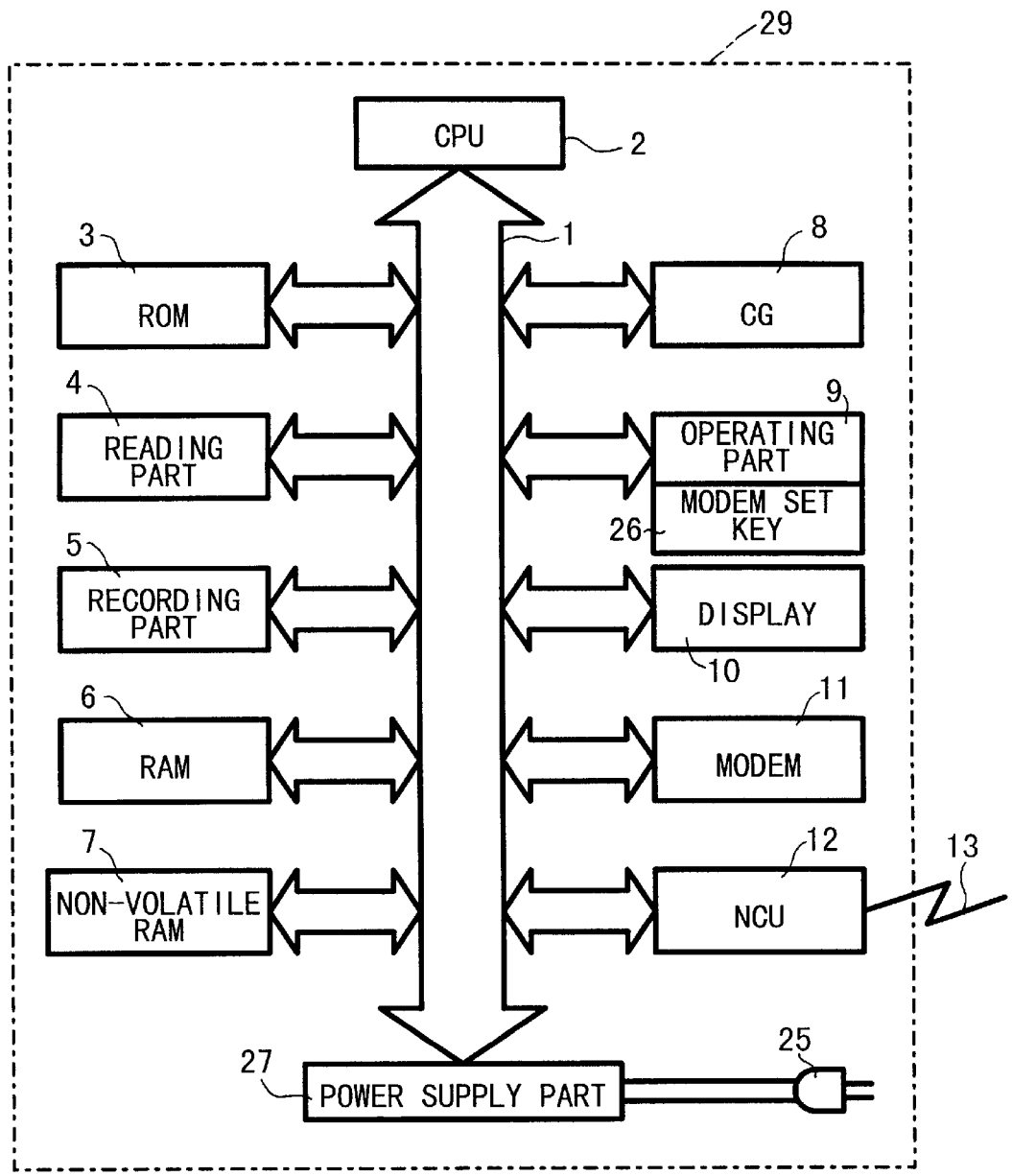
FIG. 1 is an exemplary block diagram of a facsimile apparatus with a power supply device according to an exemplary embodiment of the invention.

FIG. 1 is a block diagram of a facsimile apparatus according to one embodiment of the invention. As shown in FIG. 1, the facsimile apparatus 29 includes a central processing unit (CPU) 2, a ROM 3, a reading part 4, a recording part 5, a RAM 6, a non-volatile RAM 7, a character generator (CG) 8, an operating part 9, a display 10, a modem 11, a network control unit (NCU) 12 and a power supply part 27. The above devices are respectively connected through the bus line 1. The configuration in FIG. 1 is only exemplary and other configurations, which may be readily known to those of ordinary skill in the art, may be used without departing from the spirit and scope of the invention.

The block parts 2–12 are grouped into a control system 100, a driving system 110 and a transmission system 120. The control system 100 includes the CPU 2, the ROM 3, the RAM 6, the non-volatile RAM 7, the CG 8, the operating part 9 and the display 10. The driving system 110 includes the reading part 4 and the recording party 5. The transmission system 120 includes the modem 11 and the NCU 12.

The CPU 2 may be, for example, a microprocessor that controls each of the other devices, such as the reading part 4 and the recording part 5, according to a program or programs stored in the ROM 3. The reading part 4 may be, for example, a DMA controller in connection with an image sensor, such as a contact sensor, and a CMOS logic IC. The image data read by the image sensor, for example, may be converted into binary data under the control of the CPU 2. The binary data may thereafter be serially stored in the RAM 6, for example.

The recording part 5 may include, for example, a DMA controller, an ink jet recording device and a CMOS logic IC. The recording part 5 reads out the recording data from the RAM 6 and records on a recording medium as a hard copy.

The RAM 6 stores various binary data, such as the binary data read by the reading part 4, binary data demodulated by the NCU 12 and the modem 11, binary data recorded by the recording part 5 and binary data output to the external transmission line 13. The non-volatile RAM 7 can store desirable data, such as shortened dial data, i.e., "speed dial" data, "one touch dial" data, and the like, even if input of the AC power supply 25 to the facsimile apparatus 29 is shut down. The CG 8 may be, for example, a ROM to store character data in a predetermined code, such as JIS code or ASCII code. The CG 8 outputs character data (2-byte data) corresponding to the predetermined code.

The operating part 9 has a start key (not shown) to start transmission/reception of image data, a mode selection key (not shown) to select an operation mode from among a fine mode, a standard mode and an automatic reception mode, numeral keys and a one-touch key (not shown) for dialing, and a modem set key 26 by which the operating part 9 can set whether the modem 11 is placed in a sleep mode while a copy process is conducted. The display 10 may be, for example, a liquid crystal display (not shown), a cathode ray tube (CRT), computer monitor, or the like, to display a condition or an operation of the facsimile apparatus 29.

The modem 11 modulates the data stored in the RAM 6 under control by the CPU 2, and outputs the modulated data to the external transmission line 13 through the NCU 12 or demodulates the analog data transmitted from the external transmission line 13 into binary data through the NCU 12.

The power supply part 27 converts AC current from the AC power supply source 25 into DC current. Here, DC voltage supplied from the power supply part 27 to each block part includes DC voltage of +5V and DC voltage of +24V. DC voltage of +5V is supplied to each block part, such as the CPU 2 and the modem 11, in both the transmission system 120 and the control system 100. On the other hand, DC voltage of +24V is supplied to each block part such as the reading part 4 and the recording part 5 in the drive system 110.

Figure 2:
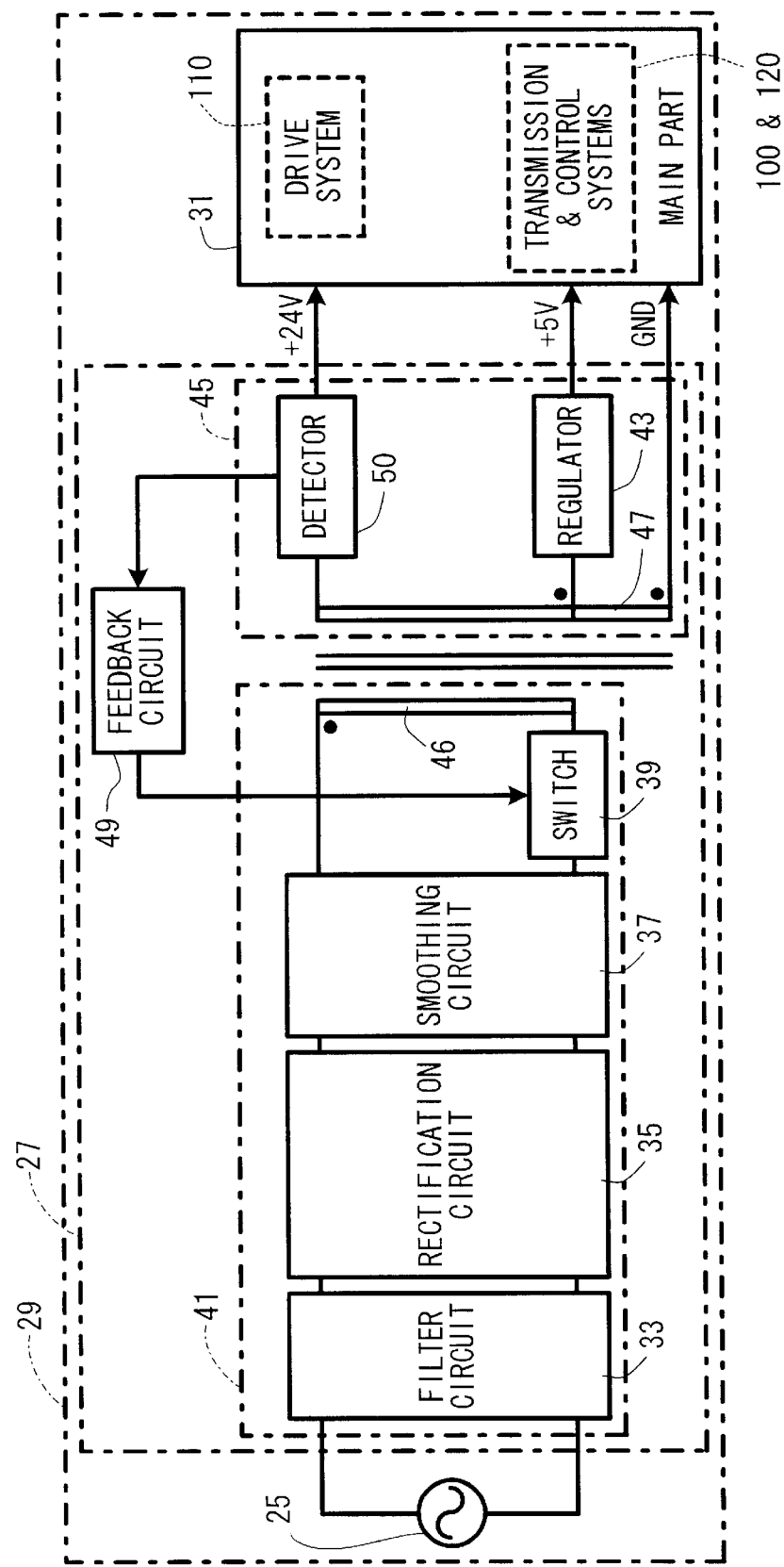
FIG. 2 is an exemplary schematic diagram of the power supply part in the power supply device.

FIG. 2 schematically shows the construction of the power supply part 27. As shown in FIG. 2, both DC voltages of +5V and +24V, which are necessary to drive the main part 31 in the facsimile apparatus, are supplied through the power supply part 27 from AC Power Supply source 25.

The power supply part 27, which uses a switching method to convert AC current into DC current, has a primary side 41 including a filter circuit 33, a rectification circuit 35, a smoothing circuit 37, a switch 39, and a primary coil 46. The power supply part 27 also includes a secondary side 45 that includes a regulator 43 outputting a constant voltage, a detector 50, and a secondary coil 47. The power supply part 27 outputs DC voltages to the main part 31 in the facsimile apparatus.

In the power supply part 27, DC voltage of +24V is produced by detecting, with detector 50, a DC voltage value obtained on the basis of the winding ratio between the primary coil 46 and the secondary coil 47, and by regulating ON/OFF of the switch 39 through the feedback circuit 49 based on the detected DC voltage. Thereby, DC voltage of +24V can be stably supplied to each block part of the drive system 110 in the main part 31 in the facsimile apparatus. Further, in the regulator 43, non-stable DC voltage within a range of +6V to +9V is input, and changes according to the load current loaded to DC voltage of +24V. The non-stable DC voltage is determined by the winding ratio calculated from a connected point against the secondary coil 47. Thereafter, the regulator 43 stably outputs DC voltage of +5V by converting the power (W), which is calculated by multiplying the voltage difference (V) between the non-stable DC voltage and DC voltage of +5V supplied to the transmission system 120 and control system 100 in the main part 31 by the load current (I) loaded to DC Voltage of +5V, into heat energy.

Here, the non-stable DC voltage of +6V to +9V increases as the load current loaded to DC voltage of +24V increases. This increase phenomenon of the non-stable DC voltage occurs when the amount of energy loaded to the secondary coil 47 increases due to an increase of the load current loaded to DC voltage of +24V. The above phenomenon occurs, in particular, when a copy function, in which a scanner function and a printer function are conducted at the same time, is used in the facsimile apparatus 29.

Figure 3:
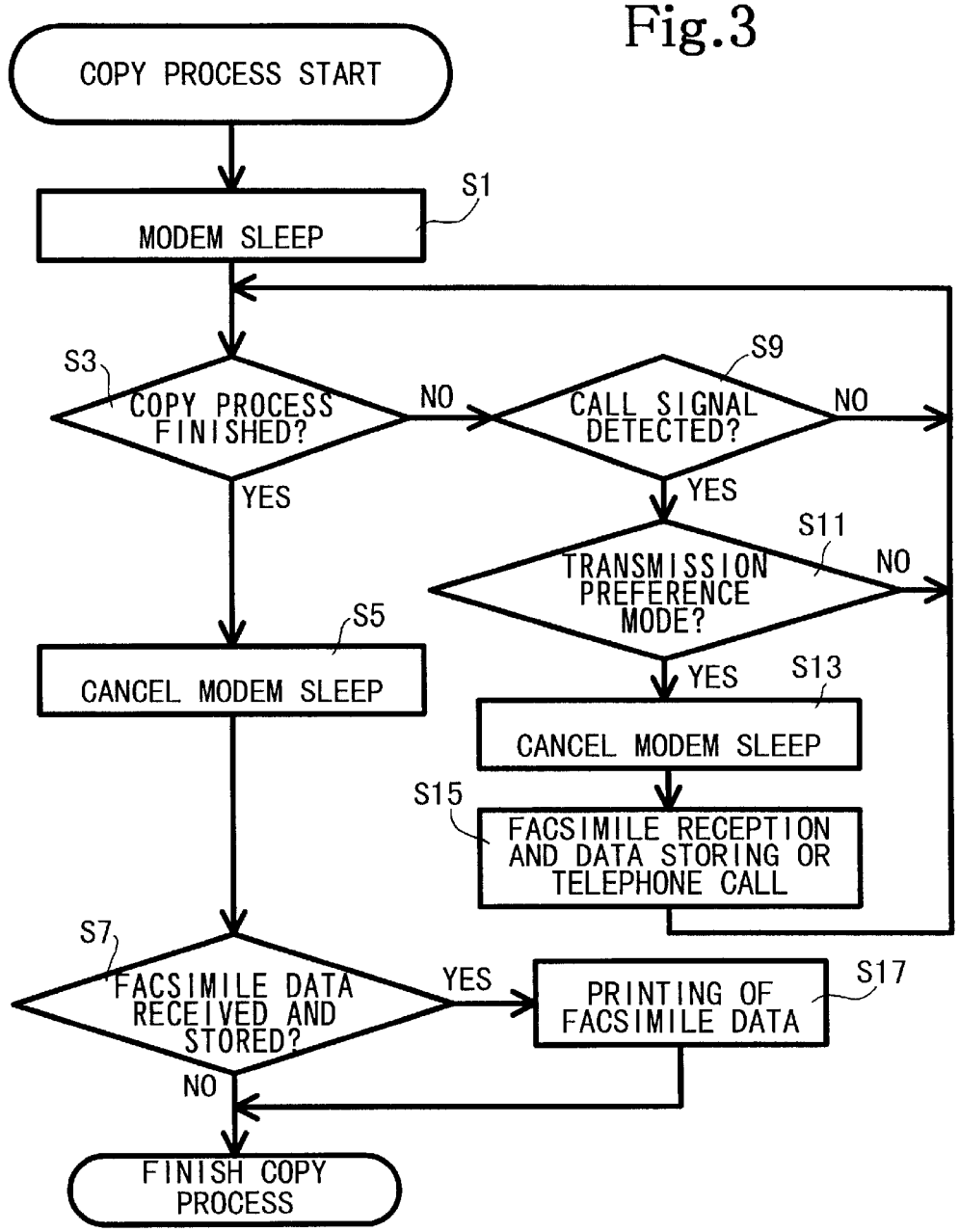
FIG. 3 is a flowchart of an exemplary operation of the copy process.

Hereinafter, operation of the facsimile apparatus, in which a copy process is conducted, is described with reference to FIG. 3. When a copy process is initiated through the operation part 9, the modem 11, to which DC voltage of +5V is supplied, is placed in a sleep state (S1). Thus, the modem 11 does not supply power to circuits therein necessary for transmission to the external transmission line 13. Thereby, the load current loaded to DC voltage of +5V decreases.

Next, it is judged whether the copy process in finished (S3). If the copy process is not finished (S3:NO), it is further judged whether a call signal from the external transmission line 13 is detected by the NCU 12 (S9). Here, if a call signal from the external transmission line 13 is not detected (S9:NO), processes in S3 and S9 are repeated until the copy process is finished.

If a call signal is detected from the external transmission line 13 (S9:YES), it is judged whether a transmission preference mode is selected on the basis of an operation of the modem set key 26 arranged in the operation part 9 (S11). If the transmission preference mode is not selected (S11:NO), the process returns to S3. Here, the transmission preference mode is a mode wherein transmission to the external transmission line 13 can be done even while the copy process is conducted. In the transmission preference mode, the modem 11 sleep mode is canceled when a call signal from the external transmission line 13 is detected during the copy process, thereby transmission to the external transmission line 13 can be performed.

On the other hand, if the transmission preference mode is set beforehand by the modem set key 26 in the operation part 9 (S11:YES), the sleep mode of the modem 11 is canceled (S13) and transmission to the external transmission line 13 becomes possible. Accordingly, facsimile data from the external transmission line 13 is received and stored in the RAM 6 or a telephone call is initiated through a telephone (S15). At this time, the facsimile receiving and storing process or the telephone call process (S15) is conducted parallel with the copy process (S3).

If the copy process is entirely finished (S3;YES), the sleep mode of the modem 11 is canceled (S5) and thereafter it is judged whether the facsimile data is received and stored in the RAM 6 during the copy process (S7). Here, if the facsimile data is received and stored during the copy process (S7:YES), the facsimile data is output and printed (S17). Thereafter the copy process is finished. On the other hand, if the facsimile data is not received and stored (S7:NO), the copy process is directly finished without printing. At that time, even if a call signal is detected from the external transmission line 13 while the received and stored facsimile data is printed (S17), the sleep mode of the modem 11 is canceled (S5) after finishing the copy process. Thus, there is no difficulty in performing transmission functions, such as a telephone or facsimile transmission function.

As mentioned above, the modem 11 is placed in a sleep state while the copy process is conducted and power is not supplied to the circuits in the modem 11 necessary for transmission with the external transmission line 13. Thus, the load current loaded to the DC voltage of +5V can be efficiently reduced. As a result, the energy quantity consumed in the regulator 43 is reduced. Accordingly, heating of the regulator 43 can be efficiently restrained and useless energy consumption is prevented.

Further the modem 11 is placed in the sleep mode while the copy process is performed during which the load current loaded to the DC voltage of +24V increases. Therefore, since the load current loaded to the DC voltage of +5V is reduced, heating of the regular 43 can be efficiently restrained. Since the load current necessary for operation of the modem 11 is reduced, heating of the regulator 43 can be restrained without disrupting the copy process.

When a call signal from the external transmission line 13 is detected during the copy process, the sleep mode of the modem 11 can be canceled on the basis of setting by the modem set key 26 in the operation part 9. Therefore, the inconvenience with conventional devices, that transmission with the external transmission line 13 becomes impossible during the copy process, is alleviated.

While the invention has been described with reference to preferred embodiments thereof, it will be understood by those skilled in the art that the foregoing and other changes in form and details can be made therein without departing from the spirit and scope of the invention.

For example, in the above embodiments, although the modem 11 is placed in a sleep mode when the copy process is conducted, the DC voltage value in the non-stable DC voltage may be measured and the modem 11 may be placed in the sleep mode when the measured DC voltage value exceeds a predetermined DC voltage value. Further, in the above embodiments, although the power supply device is described as having the DC voltages of +5V and +24V, the power supply device may have different DC voltages or more than two DC voltages.

Furthermore, although the power supply device and method has been described with reference to use with a facsimile device, the power supply device may be applied to other types of electronic devices. For example, multipurpose printer, facsimile and copier machines may be used with the power supply device and method according to this invention.

What is claimed is:

1. A facsimile apparatus, comprising:
   a first DC voltage producing part which produces a stable first DC voltage from an AC voltage;
   a second DC voltage producing part which produces a stable second DC voltage from a non-stable DC voltage that changes according to a load current loaded to the first DC voltage producing part; and
   reducing means for reducing a load current loaded to the second DC voltage producing part when the non-stable DC voltage increases.

2. The facsimile apparatus according to claim 1, wherein the facsimile apparatus has a copy function which is conducted by the first DC voltage produced in the first DC voltage producing part, and
   wherein the reducing means reduces the load current loaded to the second DC voltage producing part when the copy function is conducted.

3. The facsimile apparatus according to claim 2, further comprising a modem operated by the second DC voltage produced in the second DC voltage producing part, the modem conducting transmission with an external transmission line,
   wherein the reducing means reduces a load current necessary for the modem to operate when the copy function is conducted.

4. The facsimile apparatus according to claim 2, further comprising a setting part for setting an operating condition of the reducing means,
   wherein the reducing means selectively reduces the load current loaded to the second DC voltage producing part based on the operating condition set by the setting part when a call signal is received while the copy function is conducted.

5. The facsimile apparatus according to claim 3, wherein the reducing means places the modem in a sleep mode after the copy function in started.

6. The facsimile apparatus according to claim 5, wherein the modem has circuits used in transmission with the external transmission line and a supply of power to the circuits is stopped when the modem is placed in the sleep mode.

7. The facsimile apparatus according to claim 5, further comprising:
   a modem set key arranged in the setting part, the modem set key being used for setting a transmission preference mode; and
   cancel means for canceling the sleep mode of the modem when the call signal is received during the copy function and the transmission preference mode is set by the modem set key.

8. The facsimile apparatus according to claim 7, wherein the cancel means cancels the sleep mode of the modem after the copy function is completed.

9. The facsimile apparatus according to claim 1, further comprising a drive system, wherein the drive system includes a reading part and a recording part, and wherein the drive system is driven by the first DC voltage produced by the first DC voltage producing part.

10. The facsimile apparatus according to claim 9, wherein the first DC voltage is set to +24 volts.

11. The facsimile apparatus according to claim 1, further comprising a transmission control system, wherein the transmission control system includes a modem and a CPU, and wherein the transmission control system is driven by the second DC voltage produced by the second DC voltage producing part.

12. The facsimile apparatus according to claim 11, wherein the second DC voltage is set to +5 volts.

13. A power supply device, comprising:
   a first DC voltage producing part which produces a stable first DC voltage from an AC voltage;
   a second DC voltage producing part which produces a stable second DC voltage from a non-stable DC voltage that changes according to a load current loaded to the first DC voltage producing part; and
   reducing means for reducing a load current loaded to the second DC voltage producing part when the non-stable DC voltage increases.

14. The power supply device according to claim 13, wherein the power supply device is connected to an electronic apparatus and wherein the reducing means reduces the load current loaded to the second DC voltage producing part when the electronic apparatus is operated in a first mode.

15. The power supply device according to claim 14, wherein the electronic apparatus includes a communication device that is operated by the second DC voltage produced in the second DC voltage producing part, and wherein the reducing means reduces a load current necessary for the communication device to operate when the electronic apparatus is operated in the first mode.

16. The power supply device according to claim 14, wherein the electronic apparatus further comprises a setting part for setting an operating condition of the reducing means,
   wherein the reducing means selectively reduces the load current loaded to the second DC voltage producing part based on the operating condition set by the setting part when a call signal is received while the electronic apparatus is operated in the first mode.

17. The power supply device according to claim 15, wherein the reducing means places the communication device in a sleep mode after operation of the electronic apparatus in the first mode is initiated.

18. The power supply device according to claim 17, wherein the communication device has circuits used in transmission and wherein a supply of power to the circuits is stopped when the communication device is placed in the sleep mode.

19. The power supply device according to claim 17, wherein the electronic apparatus further comprises:
   a set key, the set key being used for setting a communication preference mode; and
   cancel means for canceling the sleep mode of the communication device when the communication preference mode is set by the set key and a call signal is received during the operation of the electronic apparatus in the first mode.

20. The power supply device according to claim 19, wherein the cancel means cancels the sleep mode of the communication device after the operation of the electronic apparatus in the first mode is completed.

21. The power supply device according to claim 14, wherein the electronic apparatus further comprises a drive system, wherein the drive system includes a reading part and a recording part, and wherein the drive system is driven by the first DC voltage produced by the first DC voltage producing part.

22. The power supply device according to claim 13, wherein the first DC voltage is set to +24 volts.

23. The power supply device according to claim 14, wherein the electronic apparatus further comprises a transmission control system, wherein the transmission control system includes a modem and a CPU, and wherein the transmission control system is driven by the second DC voltage produced by the second DC voltage producing part.

24. The power supply device according to claim 13, wherein the second DC voltage is set to +5 volts.

25. A method of providing power to a facsimile apparatus, comprising:
   producing a stable first DC voltage from an AC voltage using a first DC voltage producing part;
   producing, using a second DC voltage producing part, a stable second DC voltage from a non-stable DC voltage that changes according to a load current loaded to the first DC voltage producing part; and
   reducing a load current loaded to the second DC voltage producing part when the non-stable DC voltage increases.

26. The method according to claim 25, wherein the facsimile apparatus has a copy function which is conducted by the first DC voltage produced in the first DC voltage producing part, the method further comprising reducing the load current loaded to the second DC voltage producing part when the copy function is conducted.

27. The method according to claim 26, wherein the facsimile apparatus further comprises a modem operated by the second DC voltage produced in the second DC voltage producing part, the method further comprising reducing a load current necessary for the modem to operate when the copy function is conducted.

28. The method according to claim 26, further comprising setting an operating condition; and
   reducing the load current loaded to the second DC voltage producing part based on the set operating condition when a call signal is received while the copy function is conducted.

29. The method according to claim 27, further comprising placing the modem in a sleep mode after the copy function is started.

30. The method according to claim 29, wherein the modem has circuits used during transmission, the method further comprising stopping a supply of power to the circuits when the modem is placed in the sleep mode.

31. The method according to claim 29, further comprising setting a transmission preference mode; and canceling the sleep mode of the modem when the call signal is received during the copy function and the transmission preference mode is set.

32. The method according to claim 29, wherein the sleep mode of the modem is canceled after the copy function is completed.

* * * * *